United States Patent
Lesage et al.

(10) Patent No.: US 12,272,343 B2
(45) Date of Patent: Apr. 8, 2025

(54) METAMATERIAL SOUND INSULATION DEVICE

(71) Applicants: ADLER EVO S.R.L., Virle Piemonte (IT); PHONONIC VIBES S.R.L., Milan (IT)

(72) Inventors: Giorgio Lesage, Turin (IT); Maurizio Tarello, Caluso (IT); Massimiliano Tiengo, Villafranca Piemento (IT); Luca D'Alessandro, Chieti (IT); Giovanni Capellari, Milan (IT); Simone Meduri, Udine (IT)

(73) Assignees: Adler Evo S.R.L, Virle Piemonte (IT); Phononic Vibes S.R.L., Milan (IT)

( * ) Notice: Subject to any disclaimer, the term of this patent is extended or adjusted under 35 U.S.C. 154(b) by 167 days.

(21) Appl. No.: 17/800,955

(22) PCT Filed: Feb. 24, 2021

(86) PCT No.: PCT/EP2021/054522
§ 371 (c)(1),
(2) Date: Aug. 19, 2022

(87) PCT Pub. No.: WO2021/170630
PCT Pub. Date: Sep. 2, 2021

(65) Prior Publication Data
US 2023/0077204 A1    Mar. 9, 2023

(30) Foreign Application Priority Data
Feb. 24, 2020   (IT) .................. 102020000003769

(51) Int. Cl.
*G10K 11/168*       (2006.01)
*B32B 3/26*         (2006.01)
(Continued)

(52) U.S. Cl.
CPC ............ G10K 11/168 (2013.01); B32B 3/266 (2013.01); B32B 3/30 (2013.01); B32B 5/02 (2013.01);
(Continued)

(58) Field of Classification Search
CPC ......... G10K 11/168; B32B 3/30; B32B 3/266; B32B 5/02; B32B 5/18; B32B 5/245;
(Continued)

(56) References Cited

U.S. PATENT DOCUMENTS

| | | | |
|---|---|---|---|
| 6,070,905 A | 6/2000 | Renault | |
| 10,952,484 B2 * | 3/2021 | Yeung | ...................... A41D 1/06 |

(Continued)

FOREIGN PATENT DOCUMENTS

| | | |
|---|---|---|
| JP | 2000265593 A | 9/2000 |
| RU | 2564047 C2 | 9/2015 |
| WO | 2020196910 A1 | 10/2020 |

*Primary Examiner* — Forrest M Phillips
(74) *Attorney, Agent, or Firm* — Elmore Patent Law Group, P.C.; Joseph C. Zucchero; Carolyn S. Elmore (57) ABSTRACT

It is described a metamaterial sound insulation device, with improved efficiency in dampening sound transmission across it compared to a traditional sound insulation device having comparable size and weight. The device is especially adapted for sound insulation in the automotive field.

16 Claims, 13 Drawing Sheets

(51) Int. Cl.
*B32B 3/30* (2006.01)
*B32B 5/02* (2006.01)
*B32B 5/18* (2006.01)
*B32B 5/24* (2006.01)
*B32B 27/06* (2006.01)
*B32B 27/20* (2006.01)
*B32B 27/30* (2006.01)
*B32B 27/32* (2006.01)
*B32B 27/34* (2006.01)
*B32B 27/36* (2006.01)
*B32B 27/40* (2006.01)
*B60R 13/08* (2006.01)

(52) U.S. Cl.
CPC ............... *B32B 5/18* (2013.01); *B32B 5/245* (2013.01); *B32B 27/065* (2013.01); *B32B 27/304* (2013.01); *B32B 27/32* (2013.01); *B32B 27/34* (2013.01); *B32B 27/36* (2013.01); *B32B 27/40* (2013.01); *B60R 13/0838* (2013.01); *B32B 27/20* (2013.01); *B32B 2262/02* (2013.01); *B32B 2262/06* (2013.01); *B32B 2266/0278* (2013.01); *B32B 2307/102* (2013.01); *B32B 2307/54* (2013.01); *B32B 2307/718* (2013.01); *B32B 2307/72* (2013.01); *B32B 2307/732* (2013.01)

(58) Field of Classification Search
CPC ..... B32B 27/065; B32B 27/304; B32B 27/32; B32B 27/34; B32B 27/36; B32B 27/40; B32B 27/20; B32B 2262/02; B32B 2262/0278; B32B 2307/718; B32B 2307/72; B32B 2307/732; B60R 13/0838
See application file for complete search history.

(56) References Cited

U.S. PATENT DOCUMENTS

| | | |
|---|---|---|
| 11,199,235 B2 * | 12/2021 | Alexander .......... B60R 13/0815 |
| 11,641,904 B1 * | 5/2023 | Leon ...................... A42B 3/064 2/411 |
| 2004/0150128 A1 | 8/2004 | Houyoux et al. |
| 2012/0037447 A1 | 2/2012 | Duval et al. |
| 2012/0155688 A1 | 6/2012 | Wilson |
| 2014/0014438 A1 | 1/2014 | Bertolini et al. |
| 2014/0027200 A1 | 1/2014 | Mori et al. |
| 2015/0315781 A1 | 11/2015 | Kang et al. |
| 2018/0340328 A1 * | 11/2018 | Koga ..................... B32B 27/40 |
| 2021/0039361 A1 | 2/2021 | Koshitouge et al. |
| 2022/0028363 A1 | 1/2022 | Koshitouge et al. |

* cited by examiner

METAMATERIAL SOUND INSULATION DEVICE

FIELD OF THE INVENTION

The present invention relates to a sound insulation device, that is, a device having the effect of dampening sound transmission across it. The device is especially adapted for sound insulation in the automotive field.

STATE OF THE ART

Sound insulation is required to guarantee and/or enhance comfort of people in a number of static or mobile applications; for instance, it may be desirable to isolate adjacent flats in buildings, next rooms in an office, or sections of productions plants; and it is usually necessary to isolate the driver or passenger compartments of cars and trucks and transportation means from different noise sources such as the engine compartment, the tire noise or the aerodynamic (airborne) noise.

Since the requirements for sound insulation in the automotive field are more stringent and demanding than in other sectors, the description that follows will refer in particular to the former, but the invention is of general applicability in any situation requiring insulation from noise.

Achieving good sound insulation in the automotive field is challenging, due to the limited space and mass available for a sound isolating component.

Isolating components for automotive applications are generally produced by coupling, according to a wide variability of architectures, layers of different materials, such as aggregates of fibers (that may be natural like cotton, polymer fibers or inorganic like glass fibers), foams, dense polymer layers, and polymer films (possibly multilayer in their turn); one or more of these layers may be loaded with fillers, such as mineral powders, to modify the properties of the base material.

These components may comprise at least one of the said layers having resilient properties, namely, capable of recovering its initial shape and size after compression or expansion, and at least a stiff, essentially incompressible layer. These components operate according to the spring-mass principle, in which the resilient layer (often also called "decoupling layer", generally the foam when present) acts as the spring, and the stiff layer acts as a mass (and it is thus called "mass layer" in the field).

One problem of these components is that, when there is the need to improve their insulating properties, the only possible strategy is to increase the thickness and weight of the mass layer in an undifferentiated way, leading to a relevant weight increase of the component. This approach is followed for example in patent application US 2004/0150128 A1, in which the stiff layer is produced by first thermoforming a foil or a flat slab of a thermoplastic material, and then adding on selected regions (preferably in the cavities) of the formed foil or slab further amounts of the same thermoplastic material, forming regions of increased thickness in the stiff layer. No teachings are provided in this document about the geometric features of these additions of thermoplastic material, namely, their thickness (absolute or relative to the starting foil or slab), their area compared to the area of the stiff layer, or their distribution on the same. Besides, this document does not provide data about the acoustic properties of the complete insulating component obtained with the described process.

The automotive industry is struggling to reduce as much as possible the weight of vehicles, to minimize their power consumption and thereby their environmental impact. The trend towards weight reduction is even more felt in electrical vehicles, in which lower weights offer the opportunity to increase autonomy either thanks to the lower mass to be moved with same battery pack, or because the weight gain can be exploited mounting batteries of increased size.

To reduce the overall weight of noise attenuating components, several documents propose to produce voids, in the form or through-holes, recesses, indentations or similar, in at least one of their layers. Components following this approach are described, for instance, in patents U.S. Pat. Nos. 5,013,597, 7,182,172 B2 and in patent application WO 2018/091301 A1.

Patent application US 2012/0155688 A1 discloses a great variety of acoustic absorbers and transducers of different constructions. One of these, described with reference to FIG. 5 of the document, applies a discontinuous stiff layer directly onto the spring layer; the stiff layer may be patterned as a grid (FIG. 5A of the document) or as a series of parallel and abutting rhomboids (FIG. 5B).

A problem with the known noise attenuating components is that they generally have good insulation performances in the high frequency range, while the insulation properties are not as good in the range from about 200 to 1000 Hz, which is very relevant for the noise sources related to automotive applications.

At present, a component achieving a good compromise between weight reduction and good insulation throughout the spectrum in mass-spring-mass mechanism of frequencies relevant for acoustic comfort is not yet available regarding the resonant frequency band.

It is an object of the present invention to provide a sound insulation device, useful in particular for use in the automotive field, which overcomes the problems of the prior art.

SUMMARY OF THE INVENTION

This object is achieved with the present invention, which relates to a metamaterial sound insulation device comprising:

a first layer, not necessarily of uniform thickness, of a first material having static Young's modulus between 1 kPa and 1 MPa;

a second layer, having a first surface adhered to a surface of the first layer and a second surface facing away from said first surface, of a second material having static Young's Modulus between 10 MPa and 2500 MPa, and weight per unit area between 0.5 and 20 kg/m$^2$;

adhered to or integral with at least one of said first or second surface of the second layer, one protrusion in the form of a network or a plurality of discrete protrusions made of a material having static Young's Modulus between 10 MPa and 2500 MPa, and weight per unit area between 0.5 and 20 kg/m$^2$, wherein the footprint of each of said discrete protrusions is not higher than 2% of the area of said first or second surface of the second layer, and the overall footprint of said one protrusion or plurality of protrusions is between 10% and 60% of the area of said first or second surface of the second layer.

BRIEF DESCRIPTION OF THE FIGURES

The invention will be described in the following with reference to the Figures, in which.

DETAILED DESCRIPTION OF THE INVENTION

The sound insulation device of the invention is a modification of the spring-mass systems of the prior art. The inventors have observed that it is possible to improve the acoustic insulation properties of the traditional systems by adding localized discrete protruding elements, or a single protruding element in the form or a network, to the mass layer; this can be done without an increase in the overall mass of the noise attenuating system.

A material having modified properties, compared to its intrinsic characteristics, by shaping, is called in material science and engineering a "metamaterial"; this definition is adopted in the present description and in the claims to refer to the assembly constituted by the second layer and the protrusions described above.

The first and second layers will also be referred to in the description that follows, respectively, as "decoupling layer" and "mass layer".

"Protrusion(s) integral with" a surface of the mass layer means that said protrusion(s) and layer are formed as a sole part, as obtained for instance by mold casting or injection molding.

The metamaterial sound insulation device of the invention is characterized by the fact that the mass layer has, on at least one of its surfaces, a continuous protrusion in the form of a network or a plurality of discrete protrusions.

In case of a single protrusion in the form of a network, this may have a regular arrangement, defining e.g. a square, rectangular, triangular or hexagonal pattern; or else, the arrangement may be irregular, with intersections (or nodes) of the network lines randomly distributed on the mass layer surface.

Similarly, the plurality of discrete protrusions may be disposed on the mass layer surface according to a regular and periodic pattern (thus defining an array) or at random.

Each of the discrete protrusions may have a footprint on the surface of the mass layer that is up to 2% of said surface; the overall footprint on the surface of the mass layer of the single protrusion in form of network, or of the plurality of discrete protrusions, is between 10% and 60% of said surface.

The decoupling layer is made of a material having a static Young's modulus in the range between 1 kPa and 1 MPa, and a density in the range from 1 to 500 kg/m$^3$, preferably between 50 and 100 kg/m$^3$. This material may be for instance a loose felt; preferably, it is a foam, especially a polyurethane (PU) foam, produced in a mold of suitable shape by reaction of a di-isocyanate or poly-isocyanate monomer with a diol or polyol monomer in the presence of a catalyst or by activation with ultraviolet light.

The mass layer is made of a material having a static Young's modulus in the range between 50 MPa and 2500 MPa, preferably between 50 MPa and 300 MPa, and a weight per unit area between 0.5 and 20 kg/m$^2$, preferably between 2 kg/m$^2$ and 7 kg/m$^2$. The material for the production of this layer may be selected among felts (of natural or synthetic fibers) or, preferably, dense polymers; preferred polymers for the production of this layer are dense PU (namely, not in form of foam), PVC, polyesters (PET), polyolefins, particularly polyethylene (PE) and polypropylene (PP), and polyamides (PA, also generically referred to as nylons).

The protrusion(s) are made of a material having a static Young's modulus between 10 MPa and 2500 MPa and density between 500 kg/m$^3$ and 8000 kg/m$^3$. The material for the production of the protrusions is conveniently selected among the same materials useful for the production of the mass layer.

The mass layer and protrusion(s) may be produced separately and adhered thereafter, for instance by gluing. In a preferred embodiment of the invention, however, the mass layer and the protrusions are manufactured as a unique piece by injection molding and thus constituted by the same material.

Various possible embodiments of the metamaterial sound insulation device of the invention are represented in FIGS. 1-12. In the drawings, the protrusions are represented as separate elements in contact with the mass layer, but it is understood that these drawings are also representative of devices of corresponding structure in which protrusions and mass layer are produced as a single piece; besides, elements and features indicated by the same numeral in the figures are the same in all embodiments.

Figure 1:
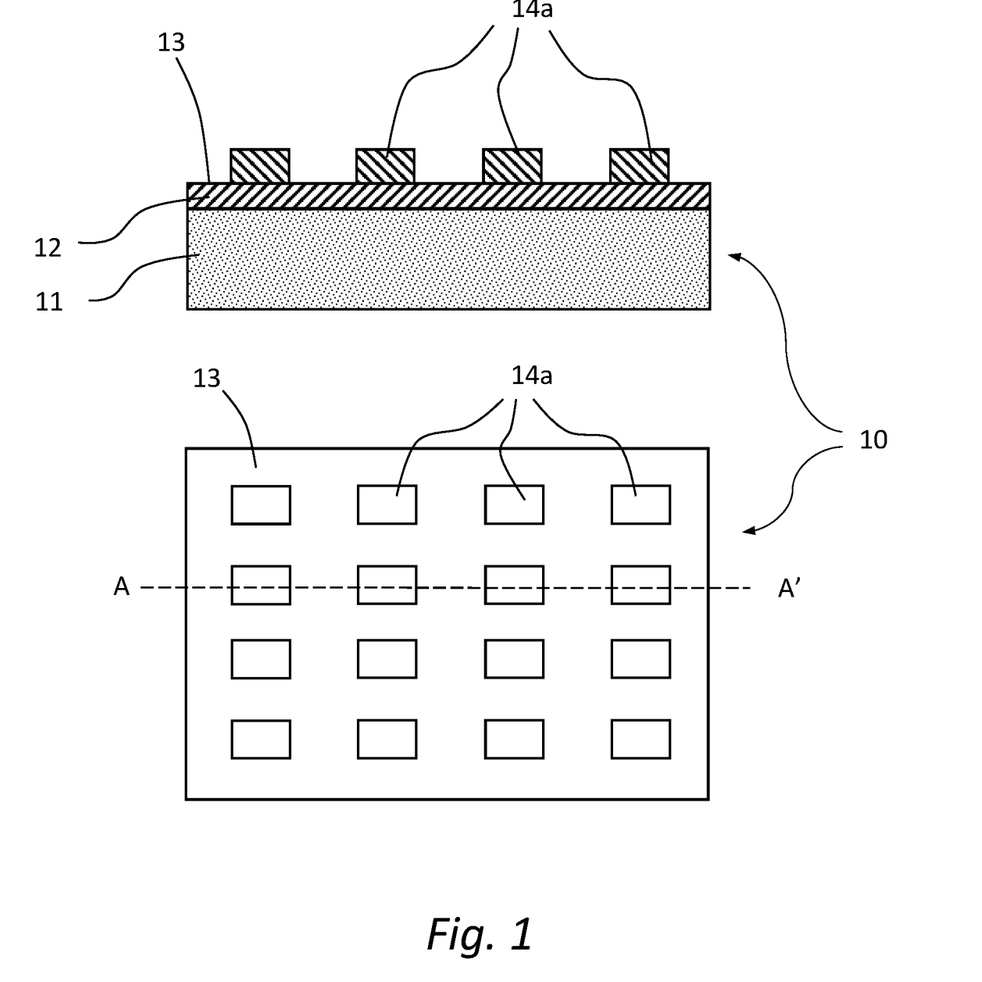
FIG. 1 shows, in a cross section view (upper part of the figure) and in top view (lower part of the figure) a first possible embodiment of a sound insulation device of the invention, comprising a plurality of discrete protrusions arranged in a two-dimensional periodic array on the second surface of the second layer.

FIG. 1 shows a device of the invention, 10, in a top view (lower part of the figure) and in a cross-section view along line A-A' of the top view (upper part of the figure). Device 10 is made of a decoupling layer 11, a mass layer 12 and protrusions, indicated cumulatively as 14a, on the second surface 13 of mass layer 12. In this embodiment, the mass and spring layers are planar and have constant thicknesses. Protrusions 14a are discrete elements, separate from each other, and are arranged on surface 13 according to a regular, periodic pattern, in this case a rectangular lattice; the base cell of the two-dimensional (2D) regular pattern could however also be a square, a rhombus, hexagonal or triangular.

Figure 2:
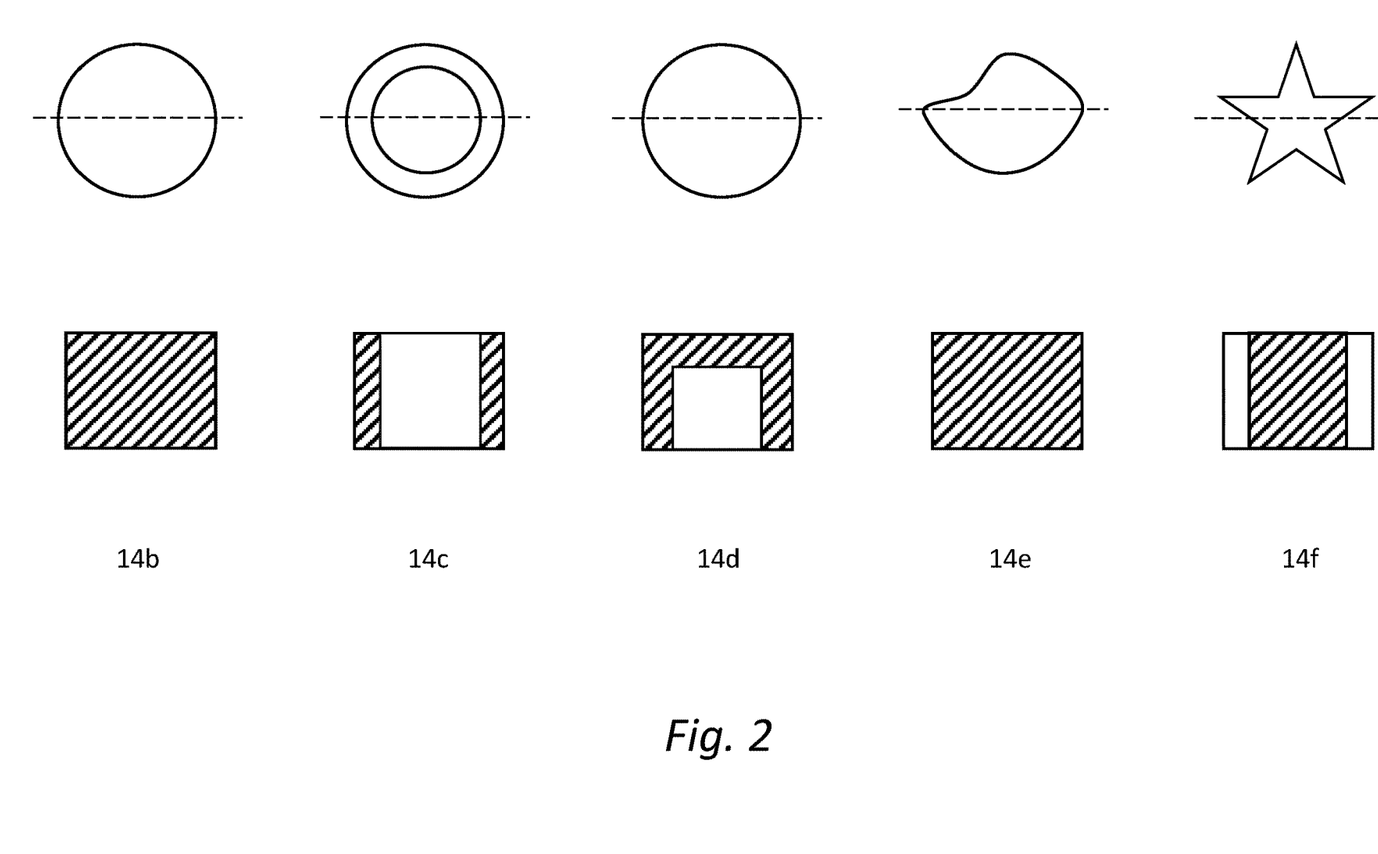
FIG. 2 shows, in top view and in cross section, possible alternative shapes of discrete protrusions that can be present in a device of FIG. 1.

FIG. 2 shows possible different shapes of protrusions, 14b to 14f, which can be used in place of protrusions 14a in a device of FIG. 1. In the figure, the upper row shows the top view of the protrusion, and the lower row shows the cross-section of the corresponding element along the dashed line shown in the top view. Very briefly, protrusion 14b is a solid cylinder; protrusion 14c is a hollow cylinder, wherein the cavity extends across the whole thickness of the protrusion; protrusion 14d is a cylinder with a recess; protrusion 14e is a solid body of constant thickness but irregular shape; and protrusion 14f is a solid body of constant thickness and regular but complex shape.

Figure 3:
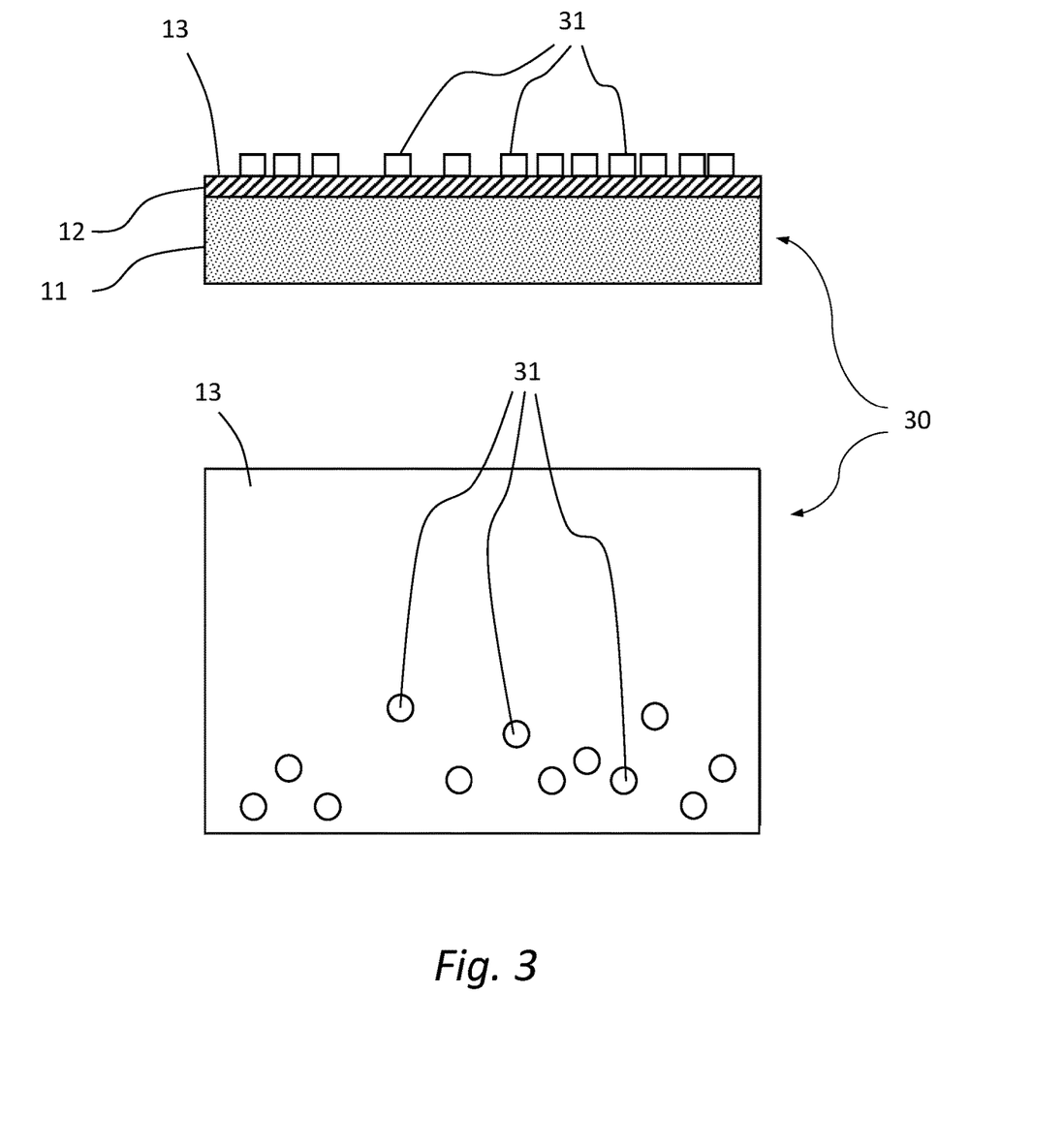
FIG. 3 shows, in a side view (upper part of the figure) and in a top view (lower part of the figure), another possible sound insulation device of the invention, comprising a plurality of discrete protrusions randomly arranged on the second surface of the second layer.

FIG. 3 shows another possible device of the invention, 30, in a top view (lower part of the figure) and in a side view (upper part of the figure). Device 30 has the same structure as device 10, with the only difference that the protrusions, 31, are randomly arranged on surface 13. Protrusions 31 are represented in the figure as having a circular section in top view, but these could obviously have any shape, for instance one of those shown in FIG. 2.

Figure 4:
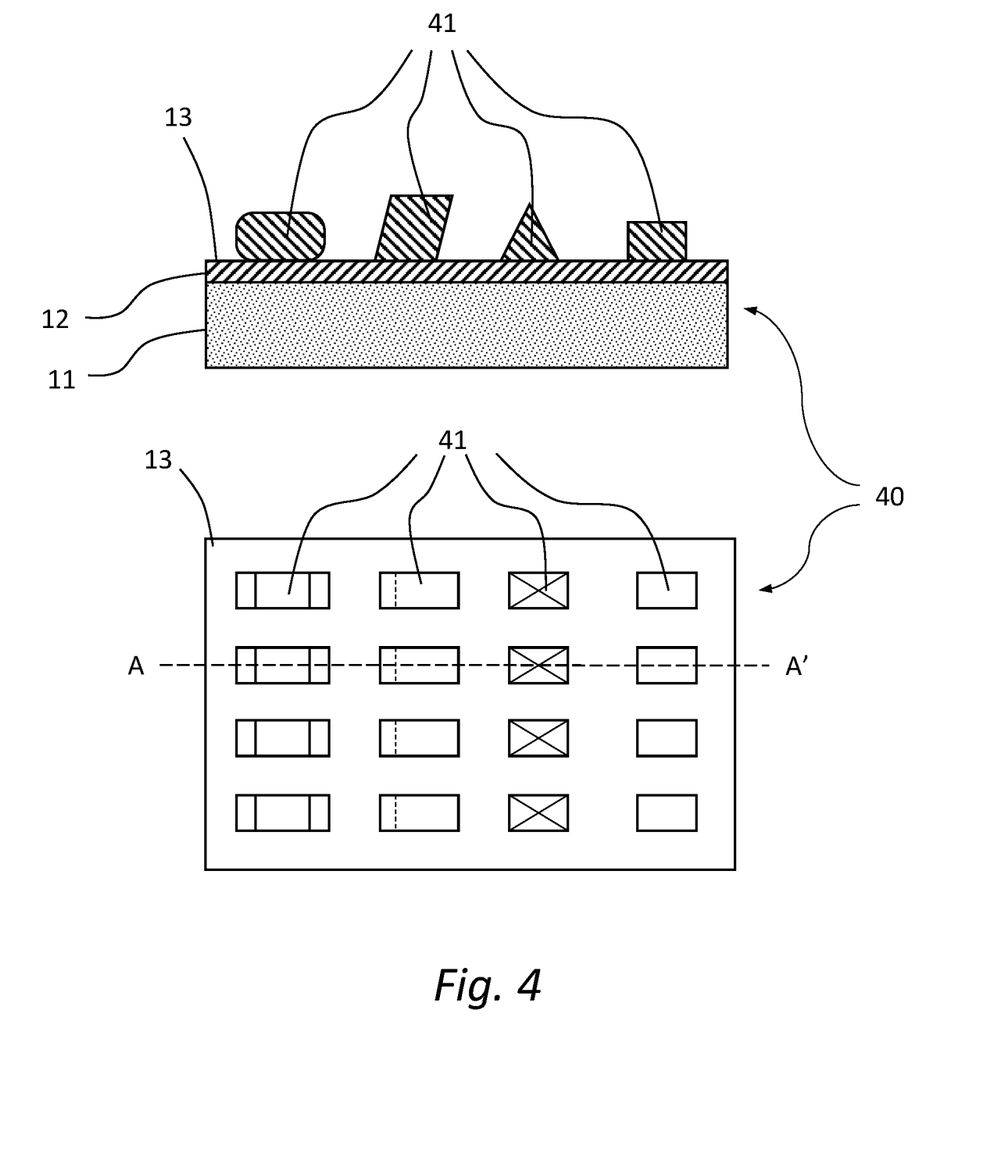
FIG. 4 shows, in cross section and top views similar to those of FIG. 1, another possible sound insulation device of the invention, comprising a plurality of discrete protrusions arranged in a two-dimensional periodic array on the first surface of the second layer, wherein the protrusions have different shapes.

The protrusions on the mass layer of a device of the invention need not be all equal. FIG. 4 shows an example of device of the invention of this kind in cross-section and top views similar to those in FIG. 1: the device of this embodiment, 40, has the same general geometry of device 10, but the protrusions, indicated cumulatively with numeral 41, have different shapes and heights.

Figure 5:
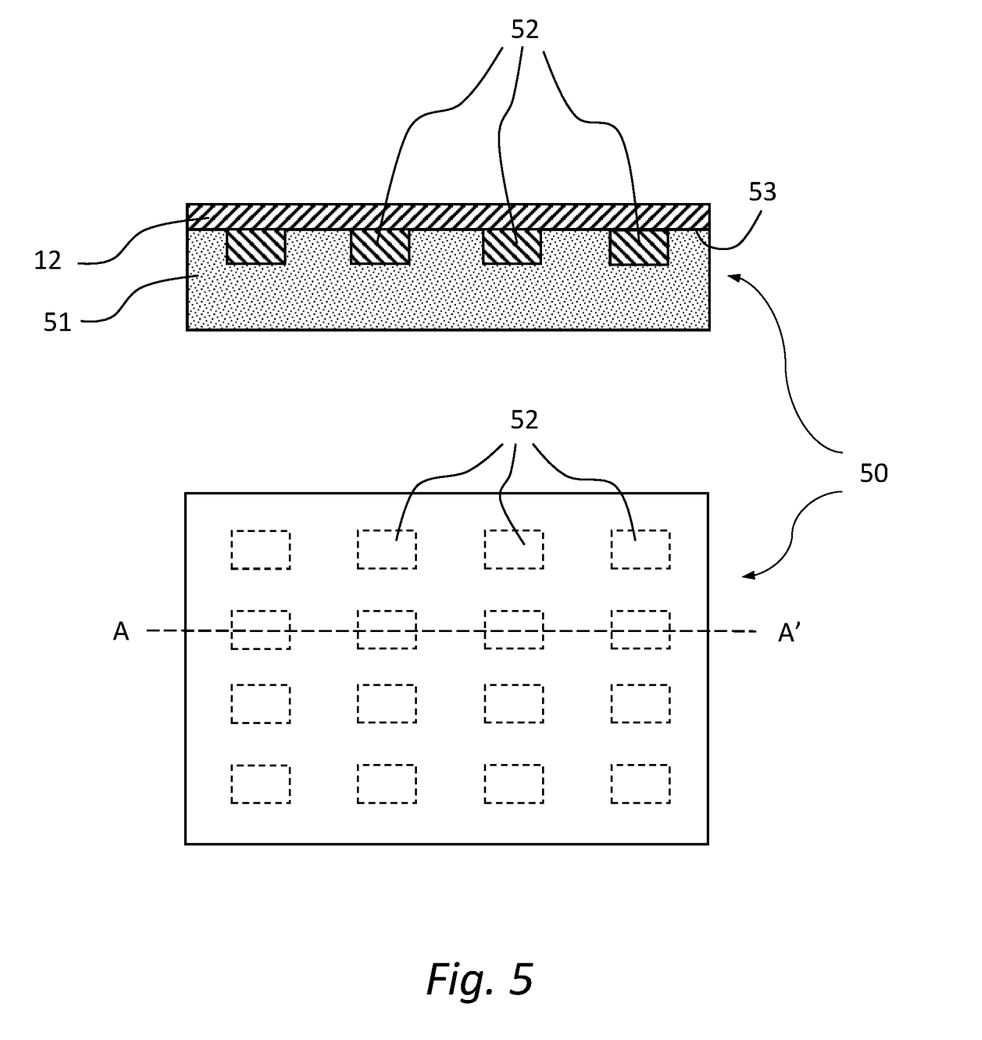
FIG. 5 shows, in cross section and top views similar to those of FIG. 1, another possible sound insulation device of the invention, comprising a plurality of discrete protrusions arranged in a two-dimensional periodic array on the second surface of the second layer.

FIG. 5 shows another possible embodiment of a device of the invention, 50, in a top view (lower part of the figure) and in a cross-section view along line A-A' of the top view (upper part of the figure). Device 50 is made of a decoupling layer 51 with recesses in the surface in contact with the mass layer 12; the protrusions, 52, are adhered to or integral with the first surface, 53, of the mass layer, and exactly fit the recesses in the decoupling layer. The dashed rectangles in the top view represent the projection of the protrusions 52 on the second (upper) surface of mass layer 12.

Figure 6:
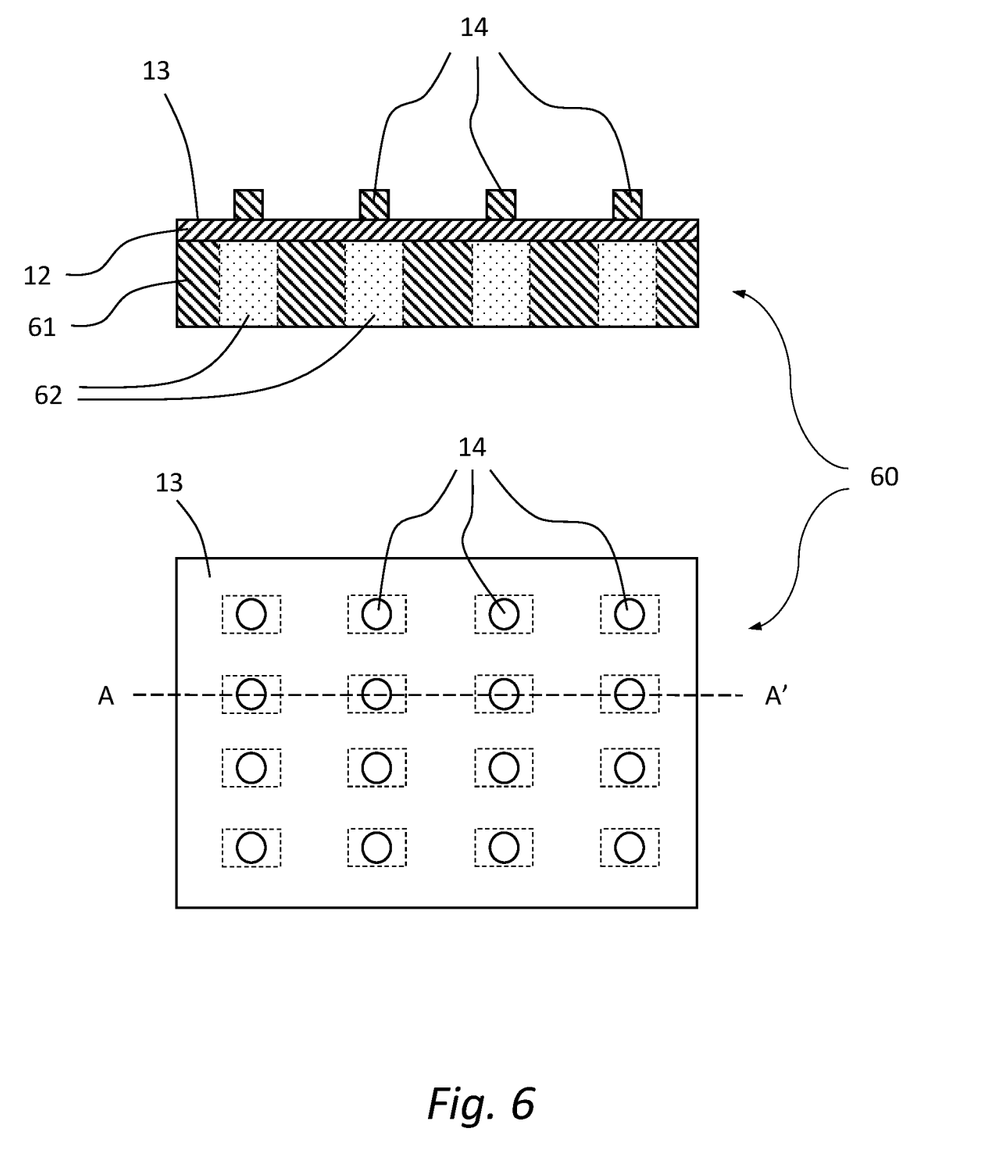
FIGS. 6 to 8 show, in cross section and top views similar to those of FIG. 1, other different possible sound insulation devices of the invention, comprising a plurality of discrete protrusions arranged in a two-dimensional periodic array on the second surface of the second layer, and in which the first layer has recesses or through holes with the same arrangement as said protrusions.
Figure 7:
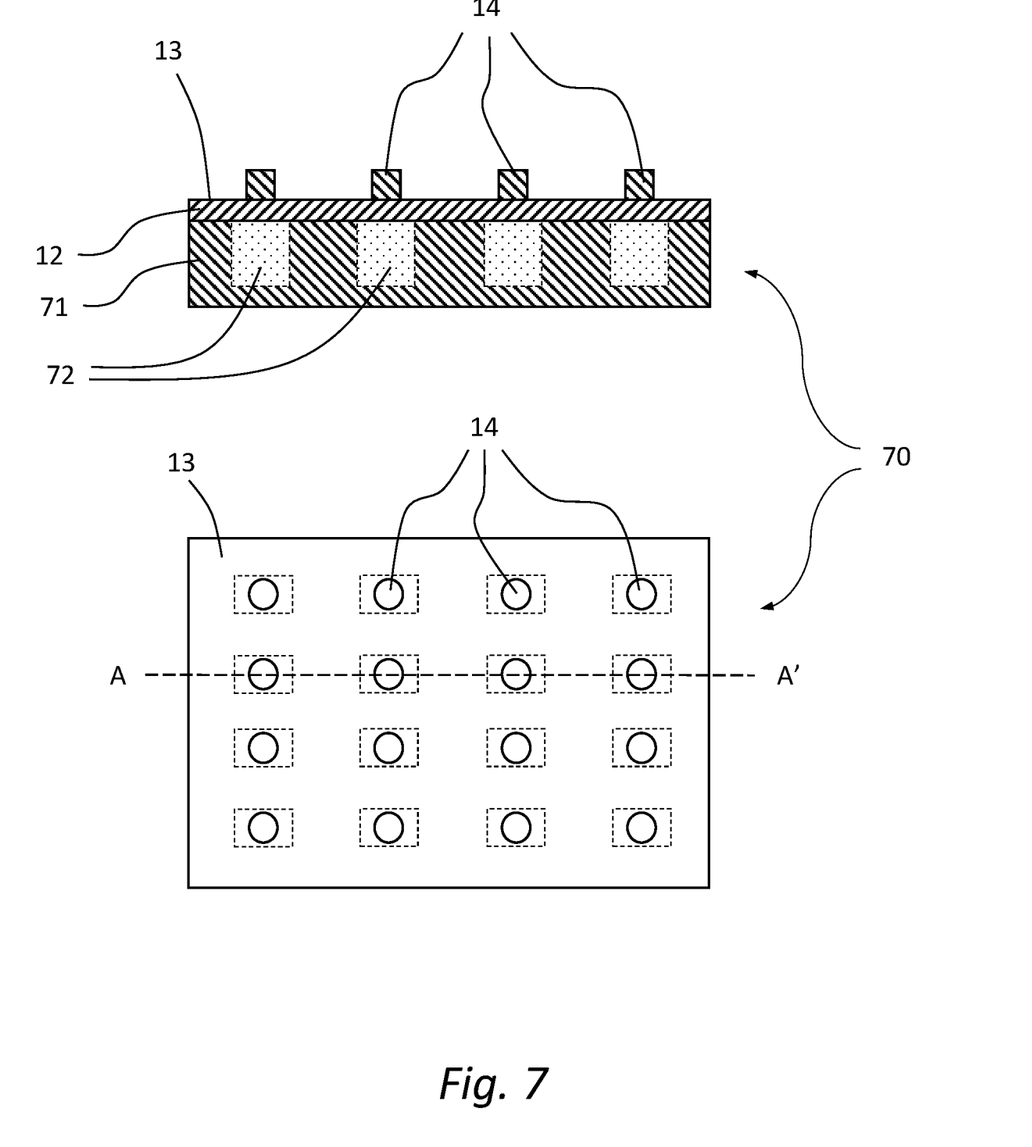
Figure 8:
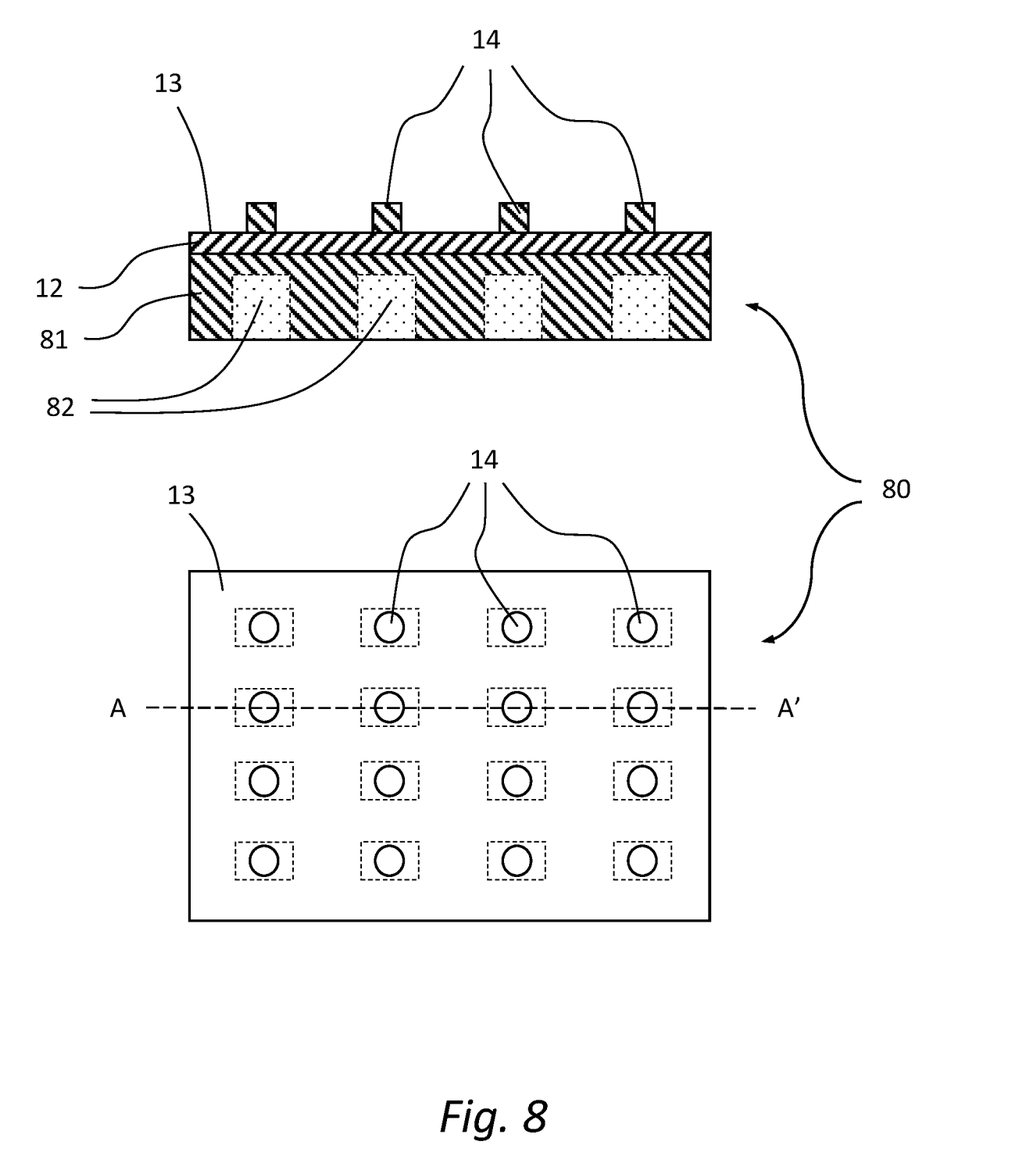

FIGS. 6, 7 and 8 schematically show other possible embodiments of the device of the invention in which the decoupling layers have apertures. In these three Figures, the dashed rectangles in the top views represent the projections on the mass layer of apertures in the decoupling layer.

Device 60 (FIG. 6) is similar in construction of the mass layer and protrusions to device 10; the decoupling layer, 61, has instead apertures 62 across its whole thickness.

Device 70 (FIG. 7) is similar to device 10, with the only difference that the decoupling layer, 71, has recesses 72 in the surface in contact with the mass layer.

Device 80 (FIG. 8) is similar to device 70, but in this case the decoupling layer, 81, has cavities 82 in the surface opposite to the surface in contact with the mass layer.

As is the case with the other embodiments presented above, in FIGS. 6 to 8 the protrusions (indicated generally as elements 14) on the mass layer have been represented as solid cylinders and the apertures (62, 72 or 82) in the decoupling layer has having rectangular section, but it will be apparent that both elements may have any shape, for instance the protrusions may have any of the shapes represented in FIG. 2 while the apertures in the decoupling layer may have, in a top view, any shape, for instance square, hexagonal, circular, elliptical, . . . . Besides, devices 50, 60, 70 and 80 have been represented in FIGS. 5-8 with an ordered, periodic arrangement of protrusions in/on the mass layer and apertures in the decoupling layer, but also in case of these embodiments the arrangement of these elements in a top view may be random, as in device 30. Finally, in the drawings in top view (lower parts of FIGS. 6, 7 and 8) the protrusions in the mass layer are represented as concentric with the apertures in the decoupling layer, but this is not an essential condition of the invention and, in a top view of a possible device of the invention, the centers of the figures (rectangles, circles, . . . ) representing protrusions could be not coincident with the centers of the figures representing the apertures.

Figure 9:
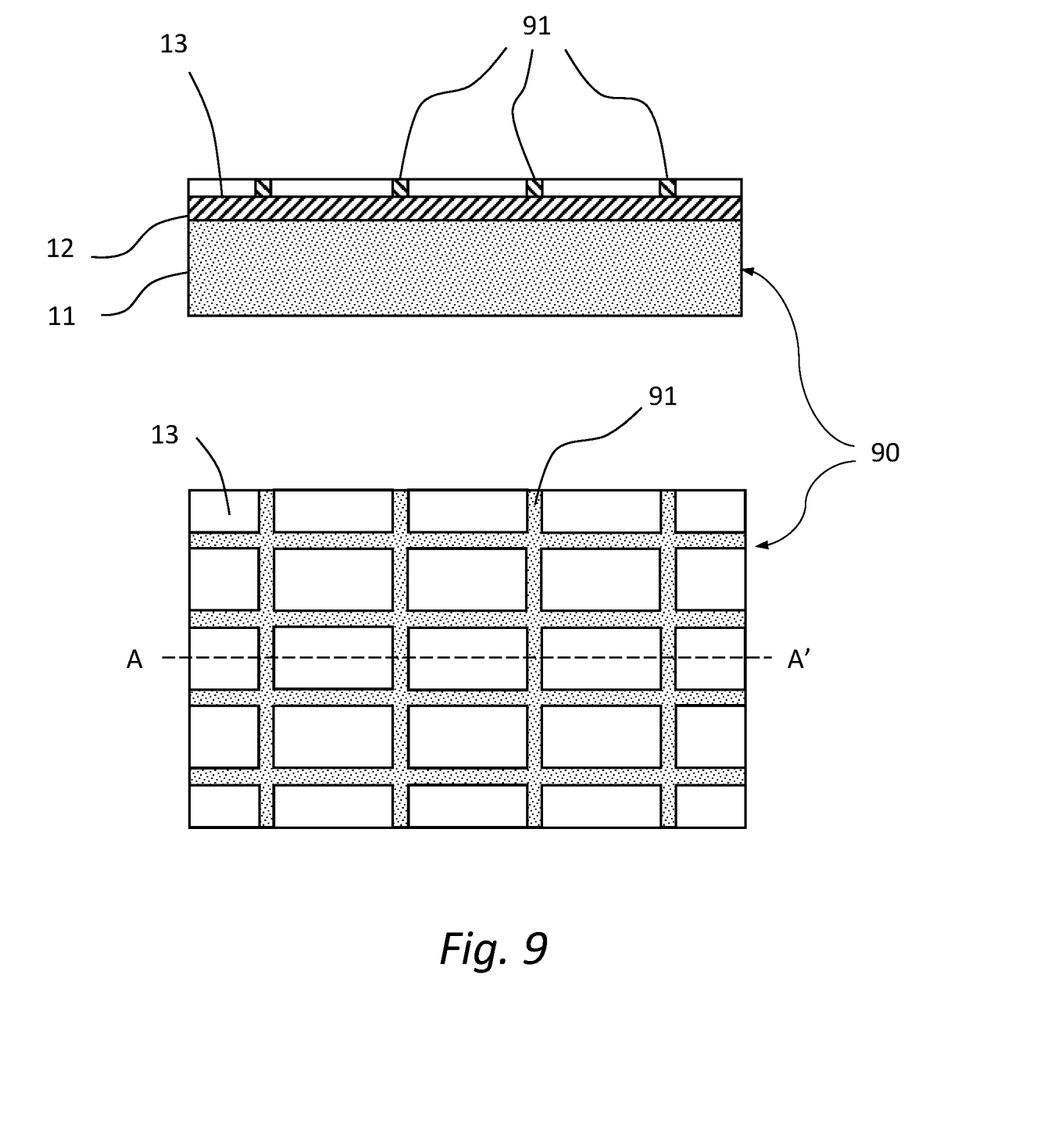
FIGS. 9 and 10 show, in cross section and top views similar to those of FIG. 1, two possible sound insulation devices of the invention comprising, respectively, one protrusion in the form of a regular network and one protrusion in the form of a non-regular network.

FIG. 9 represents another possible device of the invention, 90; device 90 is shown in the figure in a top view (lower part of the figure) and in a cross-section view along line A-A' of the top view (upper part of the figure). In this embodiment, the decoupling layer 11 and the mass layer 12 are similar to those of device 10, but rather than a plurality of protrusions 14a (or 14b-14f) in this case on the second surface of layer 12 is present a single protrusion, 91, in the form of an ordered network; in the case shown in the drawing network 91 defines a rectangular grid, but it could be for instance square, triangular or hexagonal.

Figure 10:
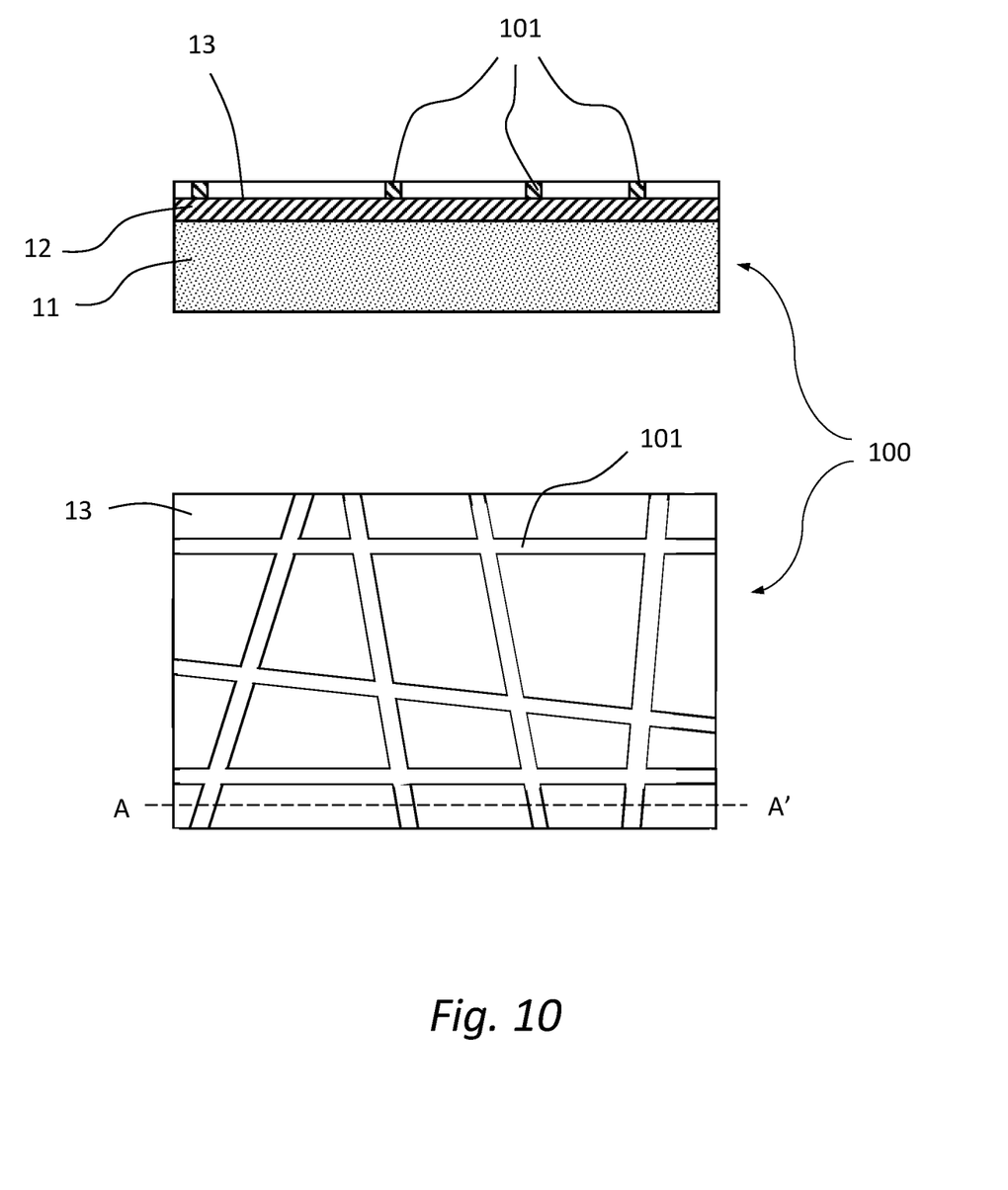

FIG. 10 shows another possible device of the invention, 100. This device is similar to device 90, with the different that in this embodiment the protrusion 101 is in the form or an irregular grid.

Figure 11:
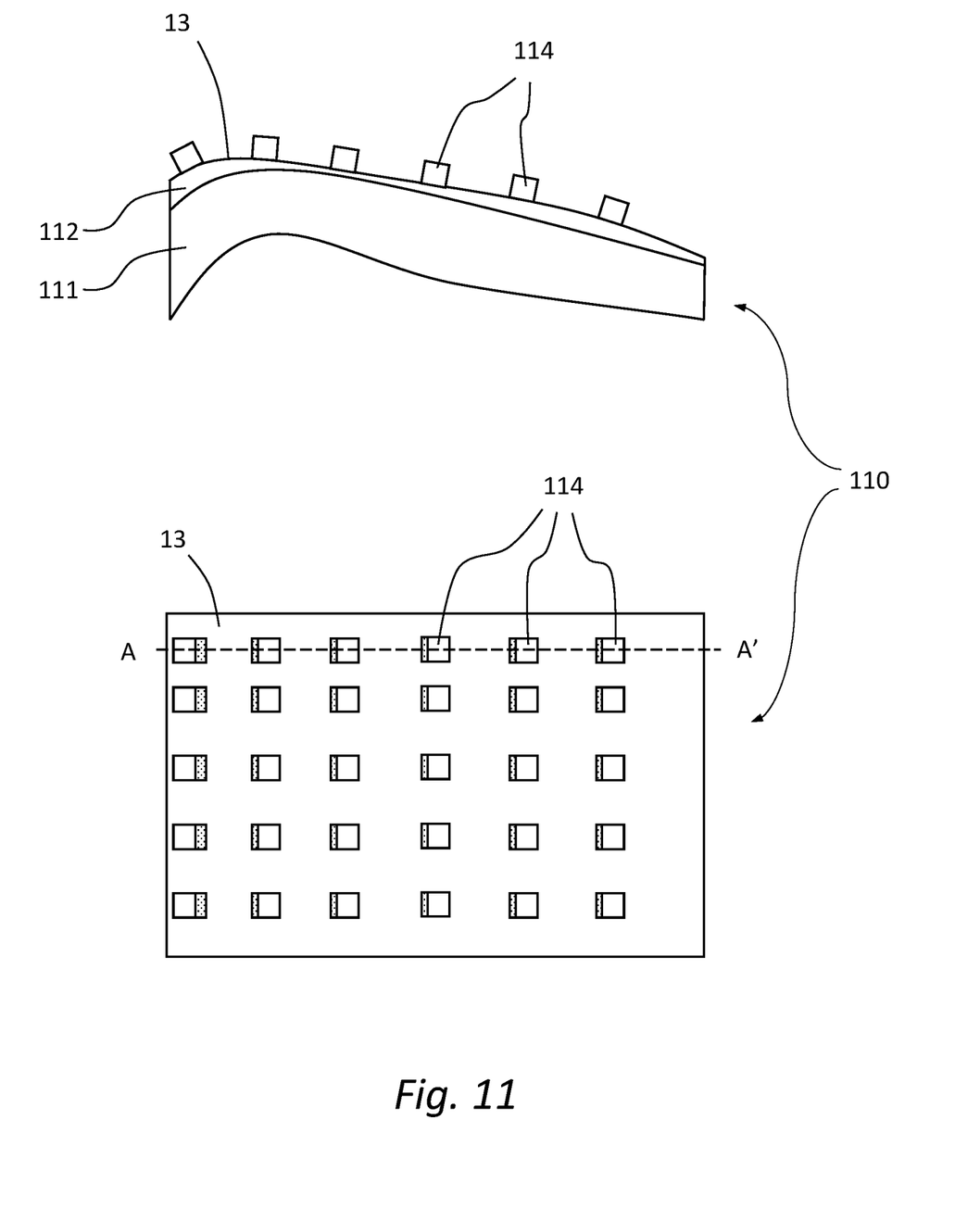
FIG. 11 shows, in cross section and top views similar to those of FIG. 1, a possible sound insulation device of the invention, comprising a plurality of discrete protrusions arranged in a two-dimensional periodic array on the second surface of the second layer, wherein the first and second layers are non-flat and have a non-constant thickness.

Finally, FIG. 11 shows schematically another possible embodiment of a device of the invention. Device 110 is irregular in thickness and shape: the thickness of decoupling layer 111 and mass layer 112 is not constant, and the cross section of the device is not planar; in the drawing the protrusions, 114, are shown all equal and arranged according to a regular pattern, but in this case too these could be not all equal and arranged irregularly, as in FIG. 3; moreover, in the example in this figure the protrusions 114 are shown on the second surface 13 of the mass layer, but these could be present on the first surface of the mass layer, as shown in FIG. 5; and the protrusions on either surface of the mass layer could also be combined with apertures in the decoupling layer, as in devices 60, 70 and 80.

The invention will be further illustrated by the examples that follow.

Example 1

Figure 12:
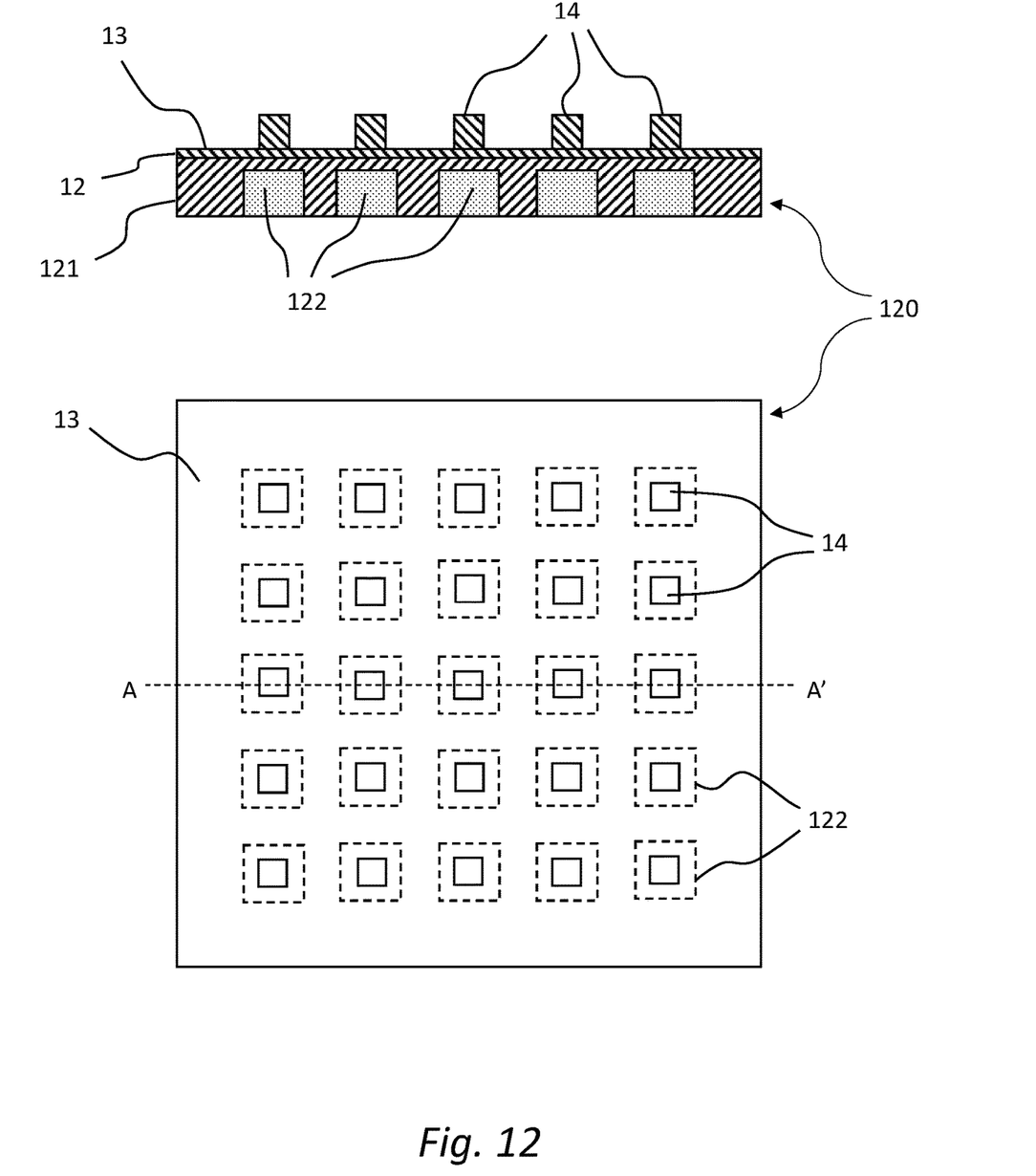
FIG. 12 shows the geometry of a specific device of the invention that has been tested in the examples.

A sound insulation device according to the invention was produced, having the geometry shown in FIG. 12 and the dimensional and physical features described below. The device had lateral size 1000×1200 mm; in FIG. 12, only a representative portion of the device is shown.

The device, 120, was made from a decoupling layer 121 made of polyurethane foam, having a thickness of 10 mm and static Young's modulus of 80 kPa. The decoupling layer had a series of recesses 122 of square shape (in a top view of the device) and arranged according to a square periodic array. The recesses had lateral size 15×15 mm, and depth 8 mm, that is, not passing through the thickness of the decoupling layer; the distance between the centers of two next recesses was 30 mm.

The mass layer, 12, was made of thermoplastic polymer with a mineral filler, had thickness 0.6 mm, density 2000 kg/m³ and static Young's modulus of 300 MPa. On surface 13 of the mass layer, facing away from the decoupling layer, protrusions 14 were present, made of the same material of the mass layer; mass layer and protrusions were produced together as a single piece by injection molding. Protrusions 14 had the shape of prisms with square base of lateral side 7 mm and height 10 mm, and were arranged according to a square array, concentric with the trace of recesses 122, as shown in the figure.

Example 2 (Comparative)

A sound insulation device of the prior art was produced, having the same lateral size as the device of Example 1.

This device comprised a decoupling layer made of the same polyurethane foam as in Example 1, with constant thickness (no recesses) of 10 mm. The mass layer of this comparative device was made of the same polymer as in Example 1, but had a constant thickness of 1 mm, with no protrusions. The device thus obtained had an overall weight per unit area almost equivalent to that of the device of the invention produced as described in Example 1.

Example 3

The sound insulation properties of the devices produced as described in Examples 1 and 2 were measured.

The test was carried out according to standard ISO 15186-1; according to this standard, the measure is carried out placing a sample to be tested in a room divided into a reverberation room, in which a sound source is disposed, and a reception room, where is present a sound detector. The two rooms are disposed vertically, with the reception room above the reverberation room; the two rooms are divided by a support frame, having an aperture of essentially the same size as the sample to be tested. The edges of the sample are laid onto the frame, and sealed to the same with a mastic to avoid any leakage of sound between the two rooms.

The difference of sound pressure level of excitation in the reverberation room and the level in the reception room, measured in dB, is the transmission loss R, calculated according to the following formula:

$$R = L_{excitation} - L_{reception} + 10 \cdot \log(S/A)$$

wherein:
L is a measured level;
S is the area test window (the aperture in the support frame); and
A is the equivalent absorption area in the reception room.

The measures were carried out at different frequency values, namely, 200, 250, 315, 400, 500, 630, 800, 1000, 1250, 1600 and 2000 Hz. The measured values are reported in FIG. 13, as transmission loss TL as a function of the frequency; the values measured on the sample of the invention are represented by the solid line, while the values measured on the sample of the prior art are represented by the dashed line (even though the spectrum of frequencies above is only sampled at the given values, the results are represented as broken lines).

Figure 13:
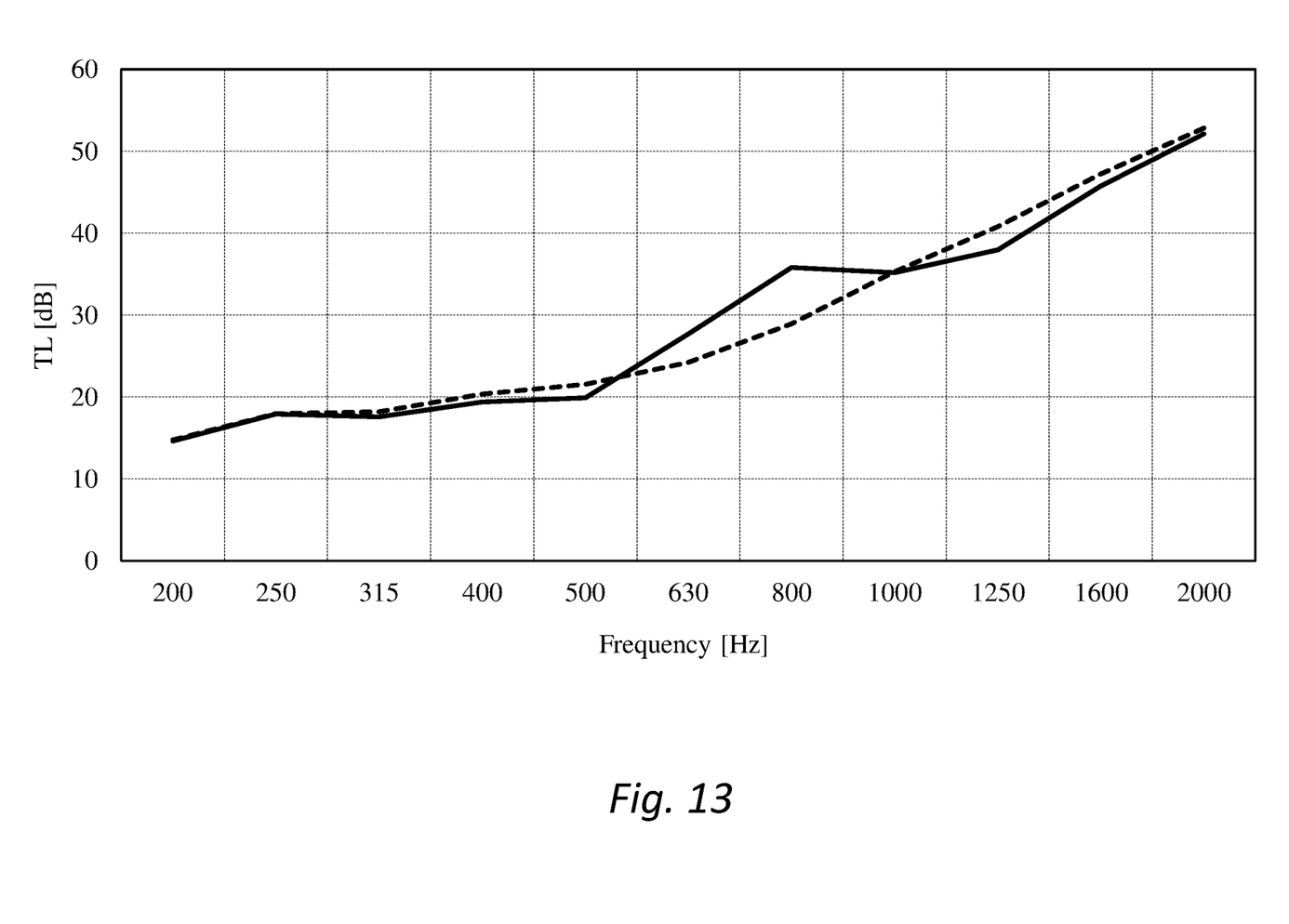
FIG. 13 shows a graph in which are compared the sound insulation properties of a device of the invention and of a device of the prior art.

From the two curves in FIG. 13, it is apparent that the device of the invention has sound insulating properties comparable to those of the device of the prior art in parts of the frequency spectrum, and improved properties in the range of frequencies between 630 and 1000 Hz.

The invention claimed is:

1. A metamaterial sound insulation device comprising:
a first layer of a first material having static Young's modulus between 1 kPa and 1 MPa and a density in the range from 1 to 500 kg/m³, preferably from 50 and 100 kg/m³;
a second layer having a first surface adhered to a surface of the first layer and a second surface facing away from said first surface, of a second material having static Young's Modulus between 10 MPa and 2500 MPa, preferably between 50 MPa and 300 MPa, and weight per unit area between 0.5 and 20 kg/m², preferably between 2 kg/m² and 7 kg/m²;
adhered to or integral with at least one of said first or second surface of the second layer, one protrusion in the form of a network or a plurality of discrete protrusions made of a material having static Young's Modulus between 10 MPa and 2500 MPa, density between 500 kg/m³ and 8000 kg/m³ and weight per unit area between 0.5 and 20 kg/m², wherein the footprint of each of said discrete protrusions is not higher than 2% of the area of said first or second surface of the second layer, and the overall footprint of said one protrusion or plurality of discrete protrusions is between 10% and 60% of the area of said first or second surface of the second layer.

2. Metamaterial sound insulation device according to claim 1, wherein said first material is a polyurethane foam.

3. Metamaterial sound insulation device according to claim 1, wherein said second material is a felt of natural or synthetic fibers or a polymer selected among polyurethanes, polyvinylchloride, polyesters, polyolefins, and polyamides.

4. Metamaterial sound insulation device according to claim 1, wherein said protrusions are adhered to the second layer by gluing.

5. Metamaterial sound insulation device according to claim 1, wherein said protrusions are integral with the second layer.

6. Metamaterial sound insulation device according claim 1, wherein a plurality of discrete protrusions are disposed on either the first or the second surface of the second layer according to a regular and periodic pattern.

7. Metamaterial sound insulation device according to claim 1, wherein a plurality of discrete protrusions are disposed in a random disposition on either the first or the second surface of the second layer.

8. Metamaterial sound insulation device according to claim 1, comprising a single protrusion in the form of a network with a regular arrangement, defining a square, rectangular, triangular or hexagonal pattern.

9. Metamaterial sound insulation device according to claim 1, comprising a single protrusion in the form of a network with an irregular geometry.

10. Metamaterial sound insulation device according to claim 1, in which the first layer has apertures across its whole thickness, or recesses in the surface in contact with the first surface of the second layer, or cavities in the surface opposite to the surface in contact with the second layer.

11. Metamaterial sound insulation device according to claim 10, wherein said apertures recesses or cavities are arranged in the first layer according to a regular and periodic pattern.

12. Metamaterial sound insulation device according to claim 11, in which first layer has recesses in the surface in contact with the second layer completely occupied by protrusions present on the first surface of the second layer.

13. Metamaterial sound insulation device according to claim 10, wherein said apertures, recesses or cavities are arranged in a random disposition in the first layer.

14. Metamaterial sound insulation device according to claim 10 wherein, in a top view of the device, the protrusions on the second layer are in positions essentially corresponding to the positions of said apertures recesses or cavities in the first layer.

15. Metamaterial sound insulation device according to claim 1, wherein said first layer has uniform thickness.

16. Metamaterial sound insulation device according to claim 1, wherein said first layer; has a non-uniform thickness.

* * * * *